F. LORIOLI.
MACHINE FOR SHAPING AND CUTTING OUT ALIMENTARY PASTES.
APPLICATION FILED SEPT. 1, 1914.
1,252,822.
Patented Jan. 8, 1918.
3 SHEETS—SHEET 1.
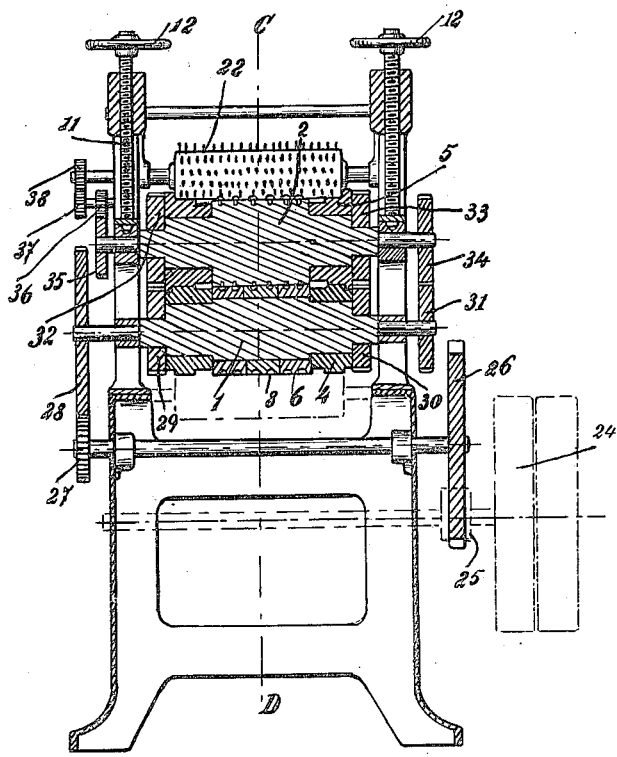
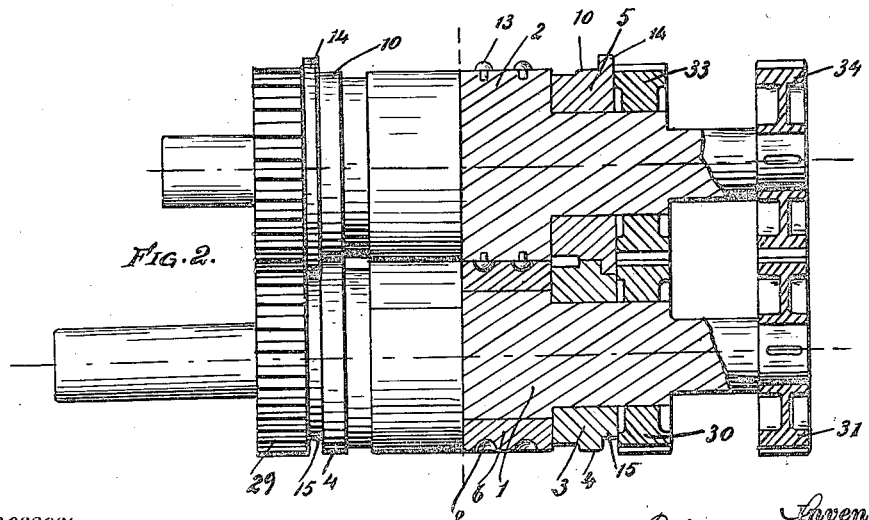
Witnesses:
M. J. Whittaker
E. B. Anderson
Inventor:
Filippo Lorioli
per
Hazeltine Lake & Co.
Attorneys.

F. LORIOLI.
MACHINE FOR SHAPING AND CUTTING OUT ALIMENTARY PASTES.
APPLICATION FILED SEPT. 1, 1914.

1,252,822.

Patented Jan. 8, 1918.
3 SHEETS—SHEET 2.

F. LORIOLI.
MACHINE FOR SHAPING AND CUTTING OUT ALIMENTARY PASTES.
APPLICATION FILED SEPT. 1, 1914.
1,252,822. Patented Jan. 8, 1918.
3 SHEETS—SHEET 3.
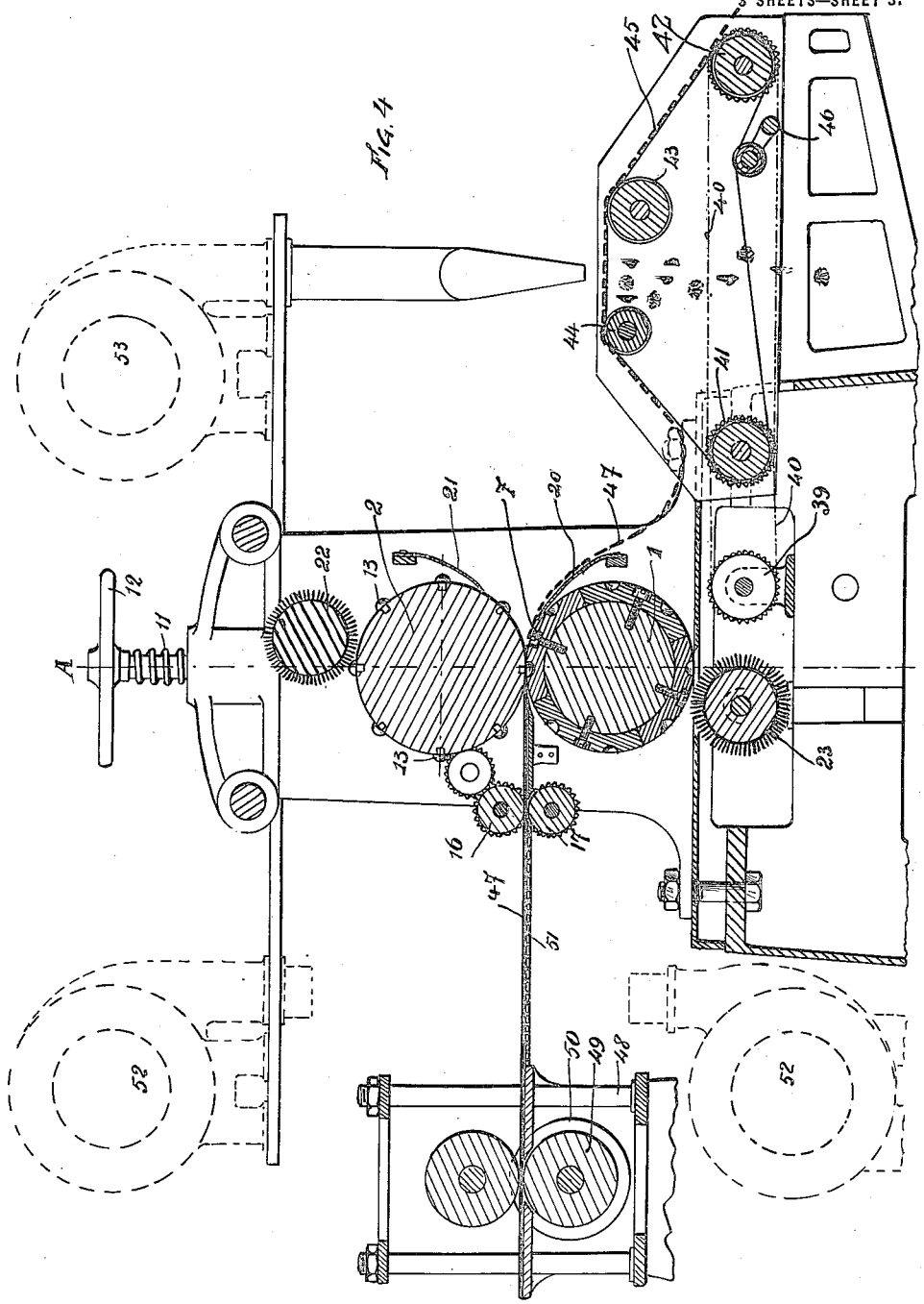
Witnesses:
M. J. Whittaker
E. B. Anderson
Inventor:
Filippo Lorioli
per
Haseltine, Lake & Co.
Attorneys.

UNITED STATES PATENT OFFICE.

FILIPPO LORIOLI, OF MILAN, ITALY, ASSIGNOR TO VITALIANO TOMMASINI, OF MILAN, ITALY.

MACHINE FOR SHAPING AND CUTTING OUT ALIMENTARY PASTES.

1,252,822.  Specification of Letters Patent.  Patented Jan. 8, 1918.

Application filed September 1, 1914. Serial No. 859,679.

*To all whom it may concern:*

Be it known that I, FILIPPO LORIOLI, engraver, subject of the King of Italy, resident of Milan, in the Kingdom of Italy, N. 99 Viale Abbruzzi, have invented new and useful Improvements in Machines for Shaping and Cutting Out Alimentary Pastes, of which the following is a specification.

Figure 5:
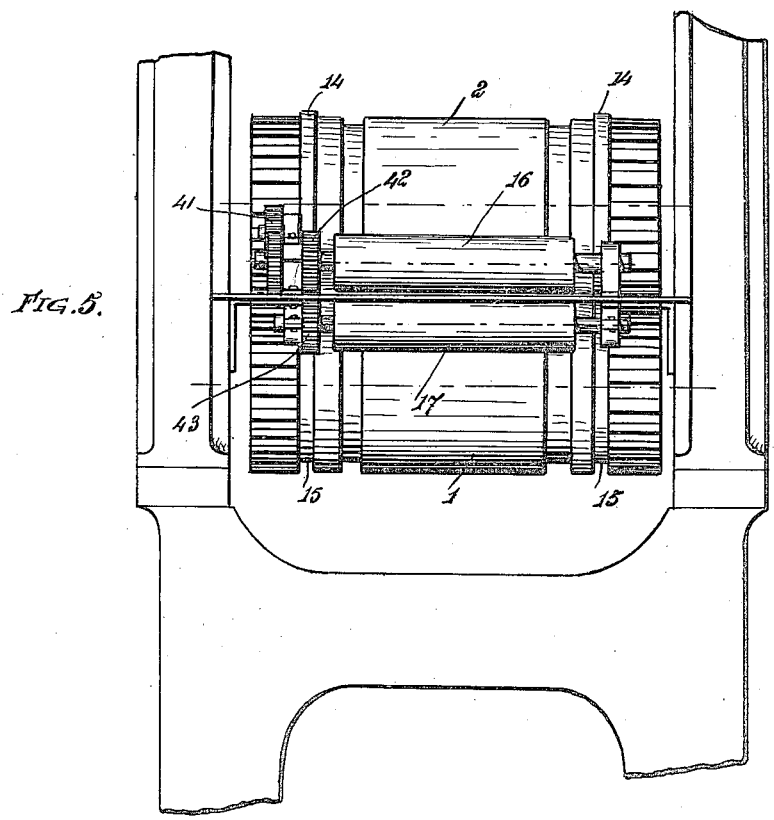
Figure 3:
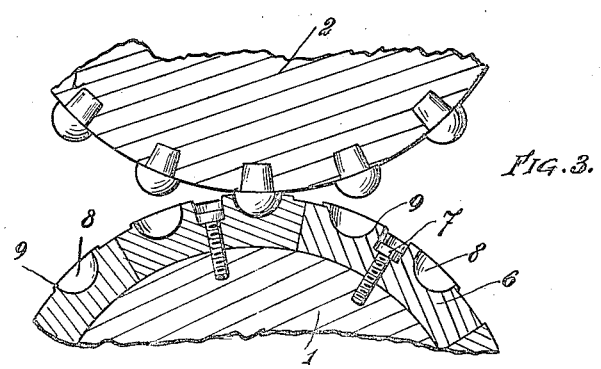

My invention refers to a machine for shaping and cutting out alimentary pastes, the machine being represented, by way of example, by the annexed drawings, in which Figure 1 is a cross section of the machine, Fig. 2 a longitudinal elevation of the shaping cylinders partially in section, Fig. 3 a cross section of these same cylinders, Fig. 4 a longitudinal section and Fig. 5 a rear view of the machine.

This machine essentially consists of cylinders 1 and 2, intended to roll, shape, and cut out the paste sheet or band passing between them.

The bottom cylinder 1 consists of a solid center roller on which, by means of cotters or pins, are secured the hardened steel boxes 3 whose outer surfaces 4 are accurately turned in order to enable a perfect contact with the corresponding similar boxes 5 fitted on the top cylinder 2. The portion of cylinder 1 situated between the two boxes 3 and 5 is lined throughout with hardened steel pieces or segments 6 of circular form closely fitting the solid center portion to which they are secured by means of the screws 7. In each piece or segment 6 recesses 8 are provided, the number and shape of which vary according to the size of the machine and the type of paste it is desired to produce. Each recess 8 is fitted with a cutting edge 9 (which may be shaped as desired) having the object of cutting the paste.

The top cylinder 2, like cylinder 1, is fitted with two hardened steel boxes 5 fixed in a manner similar to that of cylinder 1, the outer surfaces 10 of these boxes are accurately turned so as to secure a perfect contact with the corresponding surfaces 4 of boxes 3; the boxes are brought into this position by screws 11 operated by means of hand-wheels 12. Cylinder 2 is fitted with hardened steel projections 13 shaped to suit the recesses 8 in cylinder 1 and secured in holes drilled in cylinder 2. These holes should be marked out with the greatest exactness and arranged in such a way that at each revolution of the cylinders each projection 13 engages with the corresponding recess 8. The determination of the relative position of projections 13 and recesses 8 is of the utmost importance and should be made with the greatest accuracy in order to avoid waste due to defectively shaped paste pieces. The amount by which the projections 13 stand out should of course be somewhat less than the depth of recesses 8, because when the projections 13 engage the recesses 8, there must be left a small clearance between the two in order to allow for the thickness of the paste sheet.

In order to prevent axial displacements of the cylinders respecting one another, which of course would mean a defective fabric, one of the cylinders is fitted with two annular flanges 14 engaging with the corresponding grooves 15 of the other cylinder.

The two cylinders revolve in opposite directions, so as to draw in the paste sheet that is fed on to them; before reaching the two cylinders 1 and 2 the paste sheet or band passes between the two smaller cylinders 16 and 17.

The scrapers 20 and 21 respectively detach the paste and cut-out paste pieces that might stick to cylinders 1 and 2, while brushes 22 and 23 keep the cylinders clean.

The machine is driven from any convenient shafting through belt-pulley 24. On the opposite end of the pulley-shaft is keyed a pinion 25 which, through the intermediary of gear wheel 26 and pinion 27, drives the gear wheel 28 and therewith also the bottom cylinder 1. The latter carries the hardened steel gear wheels 29, 30 and 31, of which the former two have thin teeth, whereas gear 31 situated at the right hand end in Fig. 1 has big teeth.

The three wheels just mentioned engage respectively with wheels 32, 33 and 34 keyed on the top cylinder to which they accordingly impart a rotary movement. The toothed wheels transmitting motion from one cylinder to the other should be of hardened steel, in order that the projections 13 always remain in the same position with respect to the recesses 8, which of course would no longer be the case if the teeth were to get worn out. To the same object thin toothed wheels have been provided in addition to large toothed ones in order to correct the eventual differences in the transmission of motion and to insure a perfectly regular and uniform running.

The drive for the upper cylindrical brush 22 is taken from the shaft of the top cylinder 2 through gear wheels 35, 36, 37 and 38, whereas the drive for the lower cylindrical brush 23 is taken from roller 39 through a chain or an intermediate toothed wheel.

The small roller 16 is driven from the top cylinder 2 through toothed wheel 41, and it drives in turn roller 17 through gear 42 and 43.

By means of chain 40, roller 39 also drives a roller 42 which actuates a set of strings 45 suitably spaced and carried over rollers 43, 44 and 41, the string set being kept taut by the pressure roller 46.

The paste sheet or band 47 first passes between the cylinders of a rolling mill 48, the bottom cylinder 49 of which is fitted with a cutting flange 50 limiting the width of the sheet.

After leaving the rolling mill 48 the paste sheet 47 is supported by a lattice 51 and, after passing the feeding cylinders 16 and 17, enters the machine proper. On its way from the rolling mill to the feed cylinders the paste sheet is subjected to the action of air currents supplied by fans 52, 52 by which it is thoroughly dried.

After it has been dealt with by the main cylinders 1 and 2 the paste falls on to the string set 45 and is again subjected to the action of the air current supplied by fan 53 which detaches the paste-pieces that have been cut out by the machine and causes them to fall through the string spaces into a collector arranged underneath.

What I claim is:

1. In a machine for shaping and cutting alimentary pastes, a pair of coacting cylinders adapted to cut and shape the paste, means for drying said paste before its passage to said cylinders, and means for directing a jet of air against said paste after passage between said cylinders to remove the cut and shaped articles therefrom.

2. In a machine for cutting and shaping alimentary pastes, a pair of coacting cylinders adapted to cut and shape the paste, a ring of hardened steel provided with circular grooves and ribs at each end of one of said cylinders, and a ring of hardened steel provided with circular ribs and grooves at each end of the other of said cylinders, the ribs of the first mentioned rings fitting exactly within and rotating in the grooves of the last mentioned rings, whereby any displacement of the cylinders relatively to their respective coacting positions is prevented.

In testimony whereof I hereunto affix my signature in the presence of two witnesses.

FILIPPO LORIOLI.

Witnesses:
ENRICO VACONELLI,
A. R. ROBB.